United States Patent [19]

Adur et al.

[11] Patent Number: 4,957,968
[45] Date of Patent: Sep. 18, 1990

[54] ADHESIVE THERMOPLASTIC ELASTOMER BLENDS

[75] Inventors: Ashok M. Adur, Hackettstown, N.J.; Robert C. Constable, Bangor, Pa.

[73] Assignee: Monsanto Company, St. Louis, Mo.

[21] Appl. No.: 230,192

[22] Filed: Aug. 9, 1988

[51] Int. Cl.$^5$ .................. C08L 51/06; C08L 23/26
[52] U.S. Cl. ..................................... 525/74; 525/75; 525/76; 525/77; 525/78; 525/79; 525/194; 525/207; 525/221
[58] Field of Search ............... 525/74, 78, 194, 75–77, 525/79

[56] References Cited

U.S. PATENT DOCUMENTS

| | | | |
|---|---|---|---|
| 3,868,433 | 2/1975 | Bartz et al. | 525/74 |
| 3,886,227 | 5/1975 | VanBrederode et al. | 525/74 |
| 4,198,327 | 4/1980 | Matsumoto et al. | 525/74 |
| 4,230,830 | 10/1980 | Tanny et al. | 525/240 |
| 4,298,712 | 11/1981 | Machonis et al. | 525/74 |

OTHER PUBLICATIONS

Thermoplastic Elastomers, A Comprehensive Review, pp. 135–137, Legge et al., Munich, Germany, Hanser Publications, 1987.

Primary Examiner—Carman J. Seccuro
Attorney, Agent, or Firm—Rodman & Rodman

[57] ABSTRACT

The present invention relates to an adhesive thermoplastic elastomer composition comprising three major components as follows:
(a) at least one polyolefin modified by a chemically reactive functional group such as a carboxylic acid or its derivatives including anhydride, acid chloride, isocyanate, oxazoline, epoxide, amine and hydroxide;
(b) at least one other polymer prepared from one or more of the following: ethylene, propylene, butylene, isobutylene, octene-1, 4 methyl pentene-1, hexene-1 or mixtures; and
(c) at least one olefinic elastomer, including elastomeric ethylene-propylene copolymers, elastomeric ethylene-propylene terpolymers, polyisoprene, polyisobutylene, ethylene-propylene copoloymer rubber, polybutadiene, natural rubber, elastomeric polyesters, polyurethane elastomers, polyamide elastomers and mixtures.

9 Claims, No Drawings

ADHESIVE THERMOPLASTIC ELASTOMER BLENDS

BACKGROUND OF THE INVENTION

1. Field of the Invention

The present invention relates to olefinic thermoplastic elastomer blend compositions which are adherent to metal, glass, wood, polyolefins, and polar polymers with no pretreatment or use of other adhesives.

2. Description of the Prior Art

Polyolefins are polymers of relatively simple olefins such as ethylene, propylene, butene(s), isoprene(s), and pentene(s) and include copolymers and modifications as disclosed in Whittington's Dictionary of Plastics, p. 252 (Technomic Publications 1978). An undesirable characteristic common to all polyolefins is a non-polar, non-porous inert surface which does not adhere to metal, glass, polar plastics, and other surface coating and adhesives materials without proper priming or special pretreatment.

An "elastomer" is a rubber-like polymer which can be stretched under tension to at least twice its original length and retracts rapidly to its original dimensions when the tensile force is released. An elastomer has an elastic modulus less than about 6,000 psi and an elongation generally greater than 200% in the uncrosslinked state at room temperature in accordance with the method of ASTM D412.

A "thermoplastic" material is a linear or branched polymer which can be repeatedly softened and made flowable when heated and returned to a hard state when cooled to room temperature. It generally has an elastic modulus greater than 10,000 psi in accordance with the method of ASTM D638. In addition, thermoplastics can be molded or extruded into articles of any predetermined shape when heated to the softened state.

Thermoplastic elastomers (TPE) are a family of materials that have the properties of elastomers but can be processed like thermoplastics. When TPEs are made from polyolefins as described above, they are known in the industry as thermoplastic olefin elastomers (TPO). TPEs and TPOs are generally made by blending two or more polymers or by synthesizing block copolymers or graft copolymers. In each case the thermoplastic elastomer contains at least two segments, one being a rigid, usually semi-crystalline thermoplastic and the other being an amorphous elastomer.

The blending technology for manufacturing TPOs has been well known in the industry for many years. These polymer blends can achieve unique properties which bridge the gap between olefinic elastomers and polyolefinic thermoplastics. For example, an ethylene-propylene copolymer elastomer or terpolymer elastomer can be blended with polypropylene. Depending on the ratio of the elastomer to the polypropylene, the properties of the blend composition can be varied from a high modulus, high hardness grade to a flexible, soft grade. Other modifications to meet specific customer needs may be made by adding other ingredients to produce useful compounds. Examples of such technology are disclosed in U.S. Pat. Nos. 4,013,169 and 4,098,848 both to Morris, U.S. Pat. No. 3,835,201 to Fischer and U.S. Pat. No. 4,220,579 to Rinehart.

Another example of a blend of a thermoplastic and an elastomer to produce a TPO is disclosed in U.S. Pat. No. 3,806,558 to Fischer which discloses the technology of blending an ethylene-propylene-diene terpolymer (EPDM) elastomer with either polyethylene or polypropylene while being dynamically semi-cured by either peroxide or sulfur. Similar blends have also been disclosed in U.S. Pat. No. 4,130,535 to Coran et al.

Other polyolefin materials which can be used in TPO compounds include: linear low density polyethylene, copolymers of ethylene with vinyl acetate (EVA), ethylacrylate (EEA), and methyl acrylate (EMA), the semi-crystalline copolymer of propylene and ethylene and polybutene-1. The rubber also can be ethylene-propylene rubber, however, there will be no unsaturation site for crosslinking.

Another example of blended TPE has been disclosed in U.S. Pat. Nos. 4,130,535 to Coran et al; 4,311,628 to Abdou-Sabet et al and 4,409,365 to Coran et al which discloses a blend of polypropylene and crosslinked ethylene-propylene terpolymer. In spite of the fact that most of the EPDM is completely crosslinked, such blends are manufactured by a unique compounding technique which allows them to be processed as ordinary TPEs. These compounds are manufactured and marketed by Monsanto under the trademark "Santoprene".

Other methods besides blending techniques can also be used to prepare TPEs. One such example is disclosed in U.S. Pat. No. 3,792,127 to Gillies which covers block copolymerization of styrene and butadiene. U.S. Pat. No. 3,265,765 to Holden et al discloses thermoplastic elastomers made by grafting an elastomeric segment, polyisobutylene to polyethylene.

Thermoplastic polyolefin elastomers, similar to unblended polyolefins, often form a crystalline and nonpolar polyolefin-rich surface which also restricts their usefulness in adhesive applications which require good surface wettability to achieve optimal adhesive properties. The inherent characteristic of an olefin based material is its non-porous and non-reactive surface. Articles manufactured from ordinary olefin based compounds do not adhere to metal or other polar substrates without surface modification.

Priming has been the most commonly used method to improve metal adhesion or bonding of olefinic materials. Other pretreatment methods used in industry include solvent etching, sulfuric or chromic acid etching, sodium treatment, ozone treatment, flame treatment, UV irradiation and plasma treatment. However, these pretreatment processes are costly and use hazardous solvents or gases that require extra safety precautions. Furthermore, many of these conventional treatments can cause polymer chain scission, degradation, deformation and oxidation of the finished product. Many of these methods also have become subject to legislative restrictions based on environmental protection.

Recently, there has been an increasing interest by automotive and other industries to explore the possibility of using olefinic TPE compounds which can meet the application performance requirements, and can adhere to metal. It is important that these olefinic compounds can be tailor made to end use specifications and also exhibit exceptional wettability and bondability.

SUMMARY OF THE INVENTION

The present invention relates to an adhesive thermoplastic elastomer composition comprising three major components as follows:

(a) at least one polyolefin modified by a chemically reactive functional group such as a carboxylic acid or its derivatives including anhydride, acid chloride, isocyanate, oxazoline, epoxide, amine and hydroxide;

(b) at least one other polymer prepared from one or more of the following: ethylene, propylene, butylene, isobutylene, octene-1, 4 methyl pentene-1, hexene-1 or mixtures; and (c) at least one olefinic elastomer, including elastomeric ethylene-propylene copolymers, elastomeric ethylene-propylene terpolymers, polyisoprene, polyisobutylene, ethylene-propylene copolymer rubber, polybutadiene, natural rubber, elastomeric polyesters, polyurethane elastomers, polyamide elastomers and mixtures.

DESCRIPTION OF THE PREFERRED EMBODIMENTS

In accordance with present invention, an adhesive thermoplastic olefinic elastomer composition is produced, comprising:

(a) at least one polyolefin modified by a chemically reactive functional group such as a carboxylic acid or its derivatives including anhydride, acid chloride, isocyanate, oxazoline, epoxide, amine and hydroxide;

(b) at least one other polymer prepared from one or more of the following: ethylene, propylene, hexene-1 or mixtures; and (c) at least one olefinic elastomer, including elastomeric ethylene-propylene copolymers and terpolymers, polyisoprene, and polyisobutylene.

The blend composition can optionally contain the following minor components: other polymeric or elastomeric materials, inorganic fillers or reinforcers, antioxidants, UV stabilizers, release agents, processing aids, nucleating agents, colorants, pigments, and other functional additives cumulatively not exceeding 50% by weight of the total composition.

The inventive thermoplastic elastomer has the following characteristics:

1. Excellent adhesion to various metals, such as aluminum, stainless steel, copper, tin plated steel, and chrome plated steel, polyolefins, elastomers and polar polymers. The adhesion will remain at a satisfactory level throughout the service life. The actual adhesion level will depend upon each specific application and need.

2. Availability of broad mechanical properties from a soft flexible rubber-like consistency to a more rigid and hard consistency.

3. Excellent processability by conventional plastic processing equipment.

The present invention is based on the discovery that a reactive thermoplastic elastomer blend has highly desirable characteristics over conventional materials provided by blending a chemically modified polymer with ordinary polyolefins and elastomers.

In addition, the blend can optionally be semi-crosslinked crosslinked to improve desirable properties such as compression set, increase in tensile strength and abrasion resistance. More particularly, the inventive composition can be readily applied by such methods as insert molding, coextrusion, and lamination and exhibit satisfactory bonding strength to the metal with little or no intermediate pretreatment such as priming, plasma or grit blasting.

Component (a) is a chemically modified polyolefin containing reactive functional groups such as carboxylic acids and their derivatives, including acid anhydrides, acid chlorides, isocyanates, oxazolines, amines, hydroxides and epoxides. These reactive groups can be on the polymer backbone such as in copolymers of styrene and maleic anhydride available from ARCO Polymers, under the trademark Dylark TM or in a copolymer of ethylene and acrylic acid available from Dow Chemicals under the trademark PRIMACOR TM or EA TM or are grafted onto the main polyolefin backbone. Examples include polypropylene grafted with maleic anhydride available from Hercules-Himont as Hercoprime TM or PC072 TM or from Eastman Chemicals as Epolene E-43 TM, or polypropylene grafted with acrylic acid available from BP Performance Polymers under the trademark POLYBOND.

The technology for making such chemically grafted polyolefins is well known, and disclosed in U.S. Pat. No. 3,862,265 to Steinkamp et al, U.S. Pat. No. 4,001,172 to Steinkamp et al, U.S. Pat. No. 3,658,948 to McConnell, U.S. Pat. No. 3,746,676 to Joyner et al, U.S. Pat. No. 3,882,194 to Krebaum et al, Japanese Kokai 58/11508 (1983) to Okano et al, U.S. Pat. No. 4,146,590 to Yamamoto et al, U.S. Pat. No. 3,873,643 to Wu et al, U.S. Pat. No. 3,481,910 to Brunson, U.S. Pat. No. 3,480,580 to Joyner et al, U.S. Pat. No. 3,177,269 to Nowak et al, and U.S. Pat. No. 3,131,990 to Alberto et al.

Many of these chemically modified polyolefins are marketed directly as grafted copolymers or as blends. Examples of blends include Plexar TM grades from USI-Enron Chemicals, CXA TM and Bynel TM grades from DuPont, Modic TM and Novatec TM from Mitsubishi, Admer TM from Mitsui, Lupolen TM from BASF and Profax AP TM from Himont.

The unmodified polyolefin resin component (b) with which the olefinic elastomer and chemically modified polyolefin are mixed to make the blend of this invention is a solid, high molecular weight polymeric material made by polymerizing one or more olefinic monomers such as ethylene, propylene, butene-1, isobutylene, hexene-1, octene-1, 4-methyl pentene-1, in a conventional manner. Such crystalline or semi-crystalline polyolefins include branched polyethylene, linear polyethylene, polypropylene, copolymers of ethylene with vinyl acetate (EVA), ethylacrylate (EEA) and methyl acrylate (EMA), non-elastomeric copolymers of propylene and ethylene, and polybutene-1.

Component (c) used to make the inventive blend is an olefinic elastomer that is essentially an amorphous, random, copolymer of two or more monoolefins, with or without at least one copolymerizable polyene. In general, two monoolefins are used, but three or four can also be used.

Ordinarily, in a EPR or EPDM, one of the monoolefins is ethylene and the other is preferably propylene, in a weight ratio of from about 80:20 to 20:80. Component (c) can be a saturated copolymer such as EPM or an unsaturated terpolymer with nonconjugated diene such as EPDM or 1,4-hexadiene, or a cyclic diene, such as dicyclopentadiene.

Due to the chemical unsaturation, the blend with the terpolymer, EPDM, can be partially crosslinked to generate advantageous properties such as compression set, increase in tensile strength and abrasion resistance. Other elastomers used as component (c) include polybutadiene, polyisoprene, natural rubber, isobutylene polymers, elastomeric polyesters, polyurethane elastomers, polyamide elastomers and other elastomers defined in Rubber World Magazine Blue Book, pp. 386 to 493 (Lippinott and Peto 1987)

More specifically, the blend of (a) chemically modified polyolefin is exemplified by acrylic acid modified polypropylene, the (b) polyolefin resin is exemplified by polyethylene or polypropylene and the (c) elastomeric copolymer or terpolymer is exemplified by saturated ethylene-propylene copolymer rubber (EPR) or unsaturated ethylene-propylene nonconjugated diene terpolymer rubber (EPDM) and results in a thermoplastic elastomer composition which has attractive mechanical properties and exhibits sufficient surface-reactivity sites that hitherto known polyolefinic TPEs lack.

The relative proportions of the three components in the blend composition can vary over a wide ran9e to achieve the desired mechanical properties and extendability, which is a qualitative measure of thermoplasticity. The preferred ratios for each component in the blend composition depend on such criteria as the "green strength" of the elastomer(s), the solubility parameter of the elastomer(s), and extent of curing or crosslinking as well as the type and level of the functional group in component (a). The amount of component (c) elastomer can vary from about 5 to 95%, preferably from about 20 to 80% by weight of the blend composition.

The amount of the chemically modified polyolefinic polymer (a) can vary from about 1 to 80% and preferably from about 10 to 70% and most preferably from about 15 to 40% by weight of the total blend composition, depending on the reactivity of the functional group, the amount of the functional group present in the chemically modified polyolefin and the desired adhesive strength of the blend composition.

Component (b) can vary from about 5 to 90%, preferably about 10 to 70% by weight of the total blend composition.

Blends with high chemical reactivity may be desirable depending on the types of materials used and extent of bonding required. Thus, the ratio of the three components (a):(b):(c) can vary from about 0.01:94.99:5.0 to 0.01:4.99:95.0, respectively, when highly reactive functional groups such as isocyanate or anhydride or epoxides are used, to about 5:90:5 to 30:5:65, respectively, when moderately active groups such as carboxylic acids, amines and hydroxides are employed.

Fillers and reinforcing agents can be included in the inventive composition, such as talc, mica, carbonates, clays, ceramic fillers, carbon black, fiberglass, metal hydrates, oxides, as well as other suitable filler materials listed in *Rubber World Magazine Blue Book* at pages 256 to 289 (Lippincott and Peto 1987), which is incorporated by reference herein. The total filler composition can range from about 0 to 50%, preferably about 10–30% by weight of filler in the blend composition.

In addition, the elastomer in the composition can optionally be partially or completely crosslinked by methods normally used to dynamically cure thermoplastic elastomers. The elastomer in the composition can also be made highly or completely crosslinked by known methods after molding or extrusion into its final shape. Yet all such compositions will remain thermoplastic.

The curing system used to accomplish partial or complete crosslinking of the blend composition can comprise organic peroxides, sulfur, metal alkylates, epoxies, amines, azides, phenolic resin curing agents, metal oxides, quinone derivatives and the like. The particular type of curing agent used depends upon the specific cure site in the polymer and the properties desired in the finished product.

Specific examples of cure systems are disclosed in U.S. Pat. No. 3,297,674 to Breslow et al. Other suitable curing agents are disclosed in the Encyclopedia of Chemical Technology, Volume 17, Second Edition, (Interscience Publishers, 1968), Science and Technology of Rubber, edited by F. R. Eirich, Chapter 7, pp. 291-335 (Academic Press, 1978), Rubber Technology, edited by Maurice Morton, Chapter 2, pp. 19-50 (Van Nostrand Reinhold, 2nd Edition 1973) and Organic Peroxides, Volume 1, Daniel Severn, (Wiley Interscience), 1970, and in U.S. Reissue Pat. No. 31,518 to Fischer at column 3, line 26 to column 4, line 35, the disclosure of which is incorporated by reference herein.

In general, the amount of curing agent used will depend upon the extent of thermoplasticity desired in the blend composition. To obtain a partial cure, the curing agent can vary from about 1–99%, preferably about 5–75% and more preferably about 10–40% of the amount necessary for a substantially complete cure or crosslinking. The exact amount of curing agent is determined by the formulator taking into consideration such factors as the final method of fabricating the blend and the balance of properties desired for its end use. In using the limited amounts for curing agents or curatives, the mixing temperature of the blend containing the curing agent, the filler, if any, and elastomers are selected so that whatever amount of curing agent is employed, it is substantially conssed during the reaction.

A blend composition which has the desired degree of improvement in resistance to deformation at elevated temperature and is still processable as a thermoplastic would be considered to have an adequate amount of curing agent.

As a practical rule of thumb, the effective activation temperature for the curing agent can be taken as the temperature at which at least 95% of the curative has been decomposed to yield free radicals within a 0.5 minute time period. It is preferable to select a curative having an activation temperature above the softening point of the polyolefin polymers.

It is also possible to use a curing agent having an activation temperature at or below the softening point of the polyolefin polymer. The activation temperature would ordinarily be above 240° F., preferably about 270° F.

The maximum activation temperature would ordinarily not be more than 550° F., preferably not greater than 450° F. The data on the common peroxide curatives, such as 2,5-bis(tert-butylperoxy)-2,5-dimethylhexane ("Peroxide I") and dicumyl peroxide ("Peroxide II") is given in the following Table.

| Temperature °F. | Half-Life in Toluene | |
|---|---|---|
| | Peroxide I | Peroxide II |
| 240 | 21 hours | 10.2 hours |
| 270 | 2 hours | 1.75 hours |
| 335 | ca. 5 minutes | ca. 3 minutes |
| 360 | 47 seconds | 22 seconds |
| 390 | 7.2 seconds | 3.6 seconds |

In contrast to the half-life data tabulated above, at 360° F., the time to reach about 95% decomposition for Peroxide I and Peroxide II is approximately 4 minutes and 1 ½ minutes, respectively.

The dynamic crosslinking treatment substantially exhausts the action of the curing agent so that there is little or no tendency for further advancement of cure to take place subsequently. It is also desirable to further insure termination of the action of any remaining crosslinking agent, by adding to the mix, at the end of the dynamic partial curing step, a small amount of free-radical scavenging agent, such as a stabilizer or antioxidant. Such stabilizer may be added and mixed in for the last minute or so of mastication. The dynamically cured material may be subjected to one or more "refining" passes on a mill, and the stabilizer or antioxidant can be added in the course of or just prior to refining.

The curing agent can be used alone or in combination with auxiliary substances, such as a accelerators, activators, stabilizers, free radical scavenging agents, chain extenders and antioxidants. Such materials for example, include aldol alpha-naphthylamine 2,2-4 trimethyl-1-1,2-dihydroquinoline, diphenylamine acetone condensate, octylated diphenylamine N-phenyl-N'-cyclohexyl-p-phenylene diamine, 2,6-di-tert-butyl-4-methyl phenol, styrene-resorcinol resin, o-cresol monosulfide, di-p-cresol-2-propane, 2,5-di-tert-amyl hydroquinone, dilauryl-3-3'-thiodipropionate and similar dialkyl thiodipropionates. Coloring agents such as carbon black can also be used.

Other suitable additives are listed in "Rubber: Natural and Synthetic" Stern, (Palmerton Publishing Company, New York, 1967), especially at, pages 244-256; and also "Chemistry and Technology of Rubber", Davis and Blake (Reinhold, New York, 1937).

The partial or incomplete cure of the elastomer of the blend is accomplished by contacting the blend with amounts of the curing or crosslinking agent that are insufficient for a substantially crosslinked cure.

In addition to insuring that the amount of elastomeric curing or crosslinking agent is less than the amount necessary to effect a full cure or crosslinking, parameters such as the curing temperature, and time of cure are also carefully controlled to insure full activation of the curing agent present in the blend. More than one curing agent can also be used.

The curing temperatures for the blend can vary from about 160°-550° F., preferably about 240°-250° F., and most preferably about 270°-450° F. The curing temperatures are limited by the stability of the specific elastomers used in the blend.

Typical cure times can vary from about 1 to 30 minutes, preferably about 3 to 20 minutes, depending upon the cure system and temperature utilized. Naturally, the time required for the dynamic partial cure will vary with such parameters as the particular polymers employed in the blend, the kind and amount of curative, and the temperature at which the partial cure is carried out. To best accomplish the dynamic cure, the filler, the elastomers and cure system can be contacted on an open roll mix, or in an internal mixer such as a Banbury mixer, or an extruder-mixer or a transfer mixer.

A convenient method of accomplishing the blending is to premix the ingredients and then extrude the blend composition through a heated extruder. Other mixing means, such as a Brabender mixer, a Banbury mixer, roll mills and the like can also be employed for the process. Since curing agents provide some crosslinking at elevated temperatures, it is not necessary to carry out the reaction in a closed vessel. A conventional single or multiple screw extruder accomplishes blending without the use of auxiliary equipment and for this reason is a particularly desirable reaction vessel. Other suitable equipment includes the gelmat mixer, kneader-extruder, continuous and batch mixers.

Optionally, monomers such as multifunctional acrylates in small quantities on the order of about 0.1 to 1% can be introduced to provide increased cure levels if necessary, by forming some graft or cografted polymers. In any case regardless of the equipment used, the blended products can be recovered by any method or system which separates or utilizes the thermoplastic elastomer blend that is produced. Thus, the term "blend composition" includes recovery of the composition in the form of precipitated fluff, pellets, powders, and the like, as well as further blended pellets, powders and the like or in the form of shaped articles formed directly from the resulting filled elastomer blend.

The processability of the thermoplastic elastomer blend can be assessed for different applications by examining test specimens for surface finish smoothness that is substantially free from obvious imperfections. A non-thermoplastic material has an irregular grain and poor definition as well as lack of sharpness. Although these criteria are qualitative, those skilled in the art are readily able to ascertain satisfactory products from those that are unsatisfactory by visual examination and touch.

The processability of the inventive blends can be evaluated by subjecting samples of the blend to such shaping operations as extrusion, injection molding or compression molding.

Extrusion is the shaping method of choice where long continuous forms, such as hose, window seals, wire coatings, flat sheets and the like are desired. It is important that the extruded articles have acceptable surface smoothness. Extrudability can be evaluated in accordance with ASTM D2230. For coextrusion it may be necessary to match the flow characteristics of the adherent material.

For satisfactory injection molding, the blend must form a homogeneous article uniform strength in the mold. The flow viscosity characteristics of such blends are adequate to insure filling the mold propeey under the operating conditions and to obtain adhesion to the metal insert.

An alternate method of crosslinking the compositions of the present invention is by using high energy microwave or ultraviolet radiation. Radiation dose levels to achieve complete curing may range from 2 to 100 Mrads or more but a dose of 4 to 60 Mrads is preferable. For partial crosslinking, a dose of 0.5 to 10 may be effective depending on the specific elastomers in the blend.

In some cases, it may be desirable to add to the crosslinkable polymer composition a coagent to assist in the crosslinking reaction. Such coagents usually contain multiple unsaturated groups such as alkyl or acrylic esters. While their mode of action is not known with certainty, it is believed that they react with the initial radical formed on the polymer backbone to produce a more stable radical, which undergoes coupling reactions to crosslink more readily than chain scission reactions.

The coagent can be for example N,N'-m(phenylene)-dimaleimide, trimethylolpropane tri-methylacrylate, tetraallyloxyethane, triallyl cyanurate, triallyl isocyanurate, tetramethylene acrylate, or polyethylene oxide glycol dimethacrylate.

The amount of the coagent is preferably up to about 5 parts by weight per 100 parts, and preferably from about 1 to 3 parts by weight per 100 parts of the elastomer blend.

The thermoplastic nature of the inventive blends can be demonstrated by their reprocessability, especially after repeated extrusion or injection molding with retention of desirable characteristics.

In addition, all blends preferably contain stabilizer packages. The amount of stabilizer system can vary from about 0.5 to 5 parts by weight, and more preferably about 1 to 3 parts by weight of the total composition. The types and amounts of the stabilizers in the stabilizer system depends on the specific composition and the end use of the blend.

For example, a stabilizer system containing 0.2% of a hindered phenol antioxidant such as Cyanox TM 1790 from American Cyanamid, 0.2% calcium stearate and 0.2% of a phosphite secondary antioxidant such as Irgaphos 168 TM from Ciba Geigy is used. In addition, an ultraviolet stabilizer such as 0.3% of a hindered amine like Hostavin TM N20 from American Hoechst is used. All these weight percentages are based on the weight of the total composition.

It has been found that the use of a three component stabilizer system is uniquely suitable in obtaining a desirable product. The first component of the stabilizer system comprises a high molecular weight multi-functional sterically hindered phenol such as tetrakis [methylene 3-(3', 5'-di-tert-butyl-4'hydroxyphenyl) propionate] methane, more simply referred to as "tetrakis methane", available from Ciba Geigy Corp. as Irganox TM 1010. The high molecular weight multi-functional sterically hindered phenol functions as an antioxidant and thermal stabilizer. The second component of the stabilizer system is an alkyl ester of a thiodipropionate ("DLTDP"), which functions as a secondary antioxidant. The third component of the stabilizer system is a substituted benzotriazole or a hindered amine and functions in the stabilizer system to protect the blend against ultraviolet radiation. Alternatively, Naugard TM 455 available from Uniroyal Co. can be used as part of a stabilizer system. These stabilizer systems are illustrative and by no means restrictive. Any suitable stabilizer system commonly known to one skilled in the art for stabilizing polymers can be used.

In instances where flame or fire-resistance or retardance is needed, additive such as brominated or chlorinated flame retardants or aluminum or magnesium hydrates or nitrogen-phosphorus compounds may also be incorporated in the inventive blend compositions.

The adhesive thermoplastic elastomeric blend of the present invention can be manufactured in a single operation, or in a number of operational steps.

In the single step operation, the chemically modified and non-modified polyolefins, elastomers, and the necessary additives and fillers are charged at the desired ratio to a suitable mixer such as a Banbury internal mixer, transfer type extruder mixer, extruder, or any device that will enable efficient mastication of the blend at the desired temperature. The blending apparatus can be preheated to reduce the time necessary to reach the processing temperature range.

The blend is then held at the processing temperature while continuing the mixing for a time sufficient to insure that effective partial cure of the blend has been accomplished.

During processing, the stabilizer system is then contacted with the blend and processing is continued for a short time, usually for about one minute or more in order to thoroughly incorporate the stabilizer in the blend and for the purpose of deactivating any residual curing agent.

In the multi-step process, the selected elastomer and curing agent are charged to suitable apparatus wherein partial curing takes place. Thereafter, the partially cured elastomer is blended with the other selected elastomers(s), the filler, and other components as needed.

Another alternative in making the inventive composition without using prepared chemically modified polyolefin is to preblend the preferred non-modified polyolefins with elastomers, and other additives by a ribbon blender or the like and to feed the blended homogeneous material into a reaction extruder and subsequently graft the functional monomer onto the blend similar to the grafting technology employed in U.S. Pats. Nos. 3,862,265 to Steinkamp et al and 4,508,874 to Hergenrother et al.

Depending on the grafting technology used, in some cases, some crosslinking may occur as a side reaction in addition to the grafting. This may be desirable from the standpoint of end product performance criteria. In other cases, if such crosslinking is undesirable, a multiprocess approach may be the method of choice.

Generally, the inventive composition can be manufactured or processed from about 300° F. to 550° F. and more preferably, from about 350° F. to 450° F. depending upon the processing charge of the components and the type of functional monomer employed.

The adhesive thermoplastic elastomer blends of the present invention can be used in a wide range of applications, and the preferred compositions find particular usage where exceptional metal adhesion is required. Thus, the inventive composition can be used in automotive, military, aerospace and other applications where surface characteristics and bondability of non-modified polyolefin thermoplastic elastomers needs improvement.

Compositions of this type can be processed by various methods including but not restricted to insert molding, injection molding, extrusion, fluidized bed powder coating, thermal lamination, coextrusion, extrusion lamination and any other process in which a polyolefin or TPO is processed.

In coextrusion a protective coating against corrosion or other environmental conditions is formed on a metal, nylon or polyester tube. Two such examples include a hose which consists of a nylon inner core to which an adhesive TPE is coextruded with another TPE. The adhesive TPE forms a tie layer, between the nylon inner core and the secondary TPE outer jacket, providing a strong bond between all three components.

Another example is a steel tube onto which an adhesive TPE is extruded to form a coating to protect the metal against abrasion and corrosion.

Other applications include coextrusion of an adhesive TPE onto paper and, in a secondary process, contacting the adhesive coated paper with a preheated metal part, such as nails, staples, and the like, to form a continuous strip of bonded nails for use in nail guns.

Various other methods can be used to bond metal to the adhesive TPE such as induction heating, electrical heating, flame heating, ultrasonic heating, microwave heating, and the like, wherein the adhesive TPE and metal are contacted in the presence of heat to activate the adhesive bond between metal and TPE.

The inventive composition can be evaluated in terms of physical properties and adhesion using available testing methods and corresponding minimum requirements which are listed as follows:

| Physical Properties | Test Method | Range |
|---|---|---|
| Tensile Strength | ASTM D-638 | 300 to 6000 psi |
| Elongation at Break | ASTM D-638 | 100 to 10000% |
| Tear Strength | ASTM D-624 | 100 to 800 pounds per inch |
| Hardness | ASTM D-2240 | 40 Shore A to 70 Shore D |
| 100% Modulus | ASTM D-638 | 100 to 3000 psi |
| Flexural Modulus (Secant) | ASTM D-790 Method I Proc. B | 500 to 500,000 psi |
| Gardner Impact @ −40° C. | Fors Test Method B017-2 | 50 to 500 inch-pounds |

| Adhesion | Range |
|---|---|
| 180° C. peel to | |
| Aluminum | 10 to 70 pli (pounds per linear inch) |
| Copper | 2 to 20 pli |
| Stainless Steel | 10 to 100 pli |
| Chrome Plated Steel | 10 to 50 pli |
| Tin | 10 to 50 pli |
| Polypropylene | 5 pli to could not separate |
| Santoprene 50D | 5 pli to could not separate |
| Santoprene 60A | 5 pli to could not separate |
| Nylon | 2 to 10 pli |

In testing for adhesion to aluminum, copper, stainless steel, chrome plated steel and tin, a 5–7 mil thick film was placed between metal substrates and pressed out at 20 psi for 10 seconds at 400° F. set temperature using a Sentinel heat sealer Model 12 ASL.

In testing for adhesion to polypropylene and Santoprene ™ the adhesive TPE was sandwiched between aluminum and the polymer substrate.

The test pieces were pulled at 2 inches/minute on an Instron tensile tester Model #1122. The values are an average of the peeling load in pounds per linear inch after the initial peak is recorded.

An adhesive failure is evidenced by failure at the adhesive/metal (substrate) interface.

Cohesive failure is evidenced by failure of the adhesive blend or TPE.

In the following non-restrictive examples, which serve to illustrate the present invention, all parts and percentages are by weight of total composition unless otherwise indicated.

EXAMPLE 1

An adhesive thermoplastic elastomer blend was prepared using the following ingredients:

| Component | Weight % |
|---|---|
| (a) Acrylic acid grafted polpropylene with a MFR of 40 g/10 min. at 231° C./2.16 kg | 36 |
| (b) Polypropylene homopolymer with a MFR of 4.0 g/10 min. at 230° C./2.16 kg | 36 |
| (c) An ethylene-propylene-diene terpolymer elastomer with a Mooney viscosity of 60 ML (2 + 10) at 250° F. | 28 |

The blend was prepared in a laboratory Banbury and also contained a stabilizer package at 0.2% Irganox B-225, 0.2% calcium stearate and 0.2% DSTDP. This blend was then injection molded into plaques 4 inches ×6 inches ×⅛ inch and the following results obtained.

| Test | |
|---|---|
| Tensile Strength | 3,089 psi |
| Tear Strength | 777 lbs./in. |
| Shore Hardness | 62D |
| Elongation | 125% |
| Flexural Modulus | 95,900 psi |
| 100% Modulus | 2,060 psi |
| Gardner Impact | 230 inch pounds |
| Adhesive Strength: | |
| Aluminum | 14 pli adhesive failure |
| Stainless Steel | 15 pli adhesive failure |
| Polypropylene | could not separate |
| Santoprene 50D | could not separate |

EXAMPLE 2

An adhesive thermoplastic elastomer blend was prepared in a laboratory Banbury.

| Component | Weight % |
|---|---|
| (a) Acrylic acid grafted polypropylene with a MFR of 40 g/10 min. of 230° C./2.16 kg | 14 |
| (b) An ethylene-propylene-diene terpolymer elastomer that is oil extended with paraffinic oil at 20 phr and has a Mooney viscosity of 83 ML 1 + 4 @ 100° C. | 86 |

This blend contained a stabilizer package that consisted of 0.2% calcium stearate, 0.2% Irganox 1010 and 0.4% DSTDP. This blend was injection molded into plaques for testing purposes.

| Test | |
|---|---|
| Tensile Strength | 390 psi |
| Tear Strength | 112 lbs/inch |
| Shore Hardness | 55A |
| Elongation | 125% |
| Flexural Modulus | 1,130 psi |
| Adhesive Strength: | |
| Aluminum | 18 cohesive failure |
| Stainless Steel | 16 cohesive failure |
| Polypropylene | 8 cohesive failure |
| Santoprene 50D | 8 cohesive failure |
| Santoprene 60A | 8 cohesive failure |

EXAMPLE 3

An adhesive thermoplastic elastomer blend prepared with the same ingredients as Example #1 except that a random copolymer polypropylene was substituted for component (b).

| Adhesive Strength: | |
|---|---|
| Aluminum | 23 pli adhesive failure[a] |
| Stainless Steel | 26 pli adhesive failure |

[a] failure at adhesive/metal substrate interface

EXAMPLE 4

The following adhesive blend was made on a laboratory Banbury using the following components.

| Component | Weight % |
|---|---|
| (a) Acrylic acid grafted polypropylene with a MFR of 40 g/10 min. at 230° C./2.16 kg | 40 |
| (b) An ethylene-propylene-diene terpolymer elastomer this is oil extended with | 60 |

-continued

| Component | Weight % |
|---|---|
| paraffinic oil at 20 phr and has a Mooney viscosity of 83 ML 1 + 4 @ 100° C. | |

This blend contained a stabilizer package that consisted of 0.2% calcium stearate, 0.2% Irganox 1010, 0.4% DSTDP and 0.2% MD-1024.

| Test | |
|---|---|
| Tensile Strength | 888 psi |
| Tear Strength | 307 lbs./in. |
| Elongation | 230% |
| Shore Hardness | 36D |
| Flexural Modulus | 24,500 psi |
| 100% modulus | 819 psi |
| Adhesive Strength: | |
| Aluminum | 35 cohesive failure |
| Stainless Steel | 17 adhesive failure |
| Polypropylene | could not separate |

EXAMPLE 5

An adhesive thermoplastic blend was prepared using the following ingredients:

| Component | Weight % |
|---|---|
| (a) Acrylic acid grafted polypropylene with a MFR of 40 g/10 min. at 230° C./2.16 kg | 36 |
| (b) Polypropylene random copolymer with a MFR of 4.0 g/10 min. at 230° C./2.16 kg | 14 |
| (c) An ethylene-propylene-diene terpolymer elastomer with a Mooney viscosity of 60 ML (2 + 10) at 250° F. | 50 |

The blend contained 1.0% stabilizer masterbatch and was prepared in a laboratory Banbury. The blend was diced and injection molded into plaques from which test pieces were cut.

| Test | |
|---|---|
| Tensile Strength | 1,500 psi |
| Elongation | 520% |
| Tear Strength | 542 lbs./inch |
| Shore Hardness | 51D |
| Flexural Modulus | 49,872 psi |
| 100% Modulus | 1,312 psi |
| Adhesive Strength: | |
| Aluminum | 42 cohesive failure |
| Stainless Steel 304 | 36 cohesive failure |
| Polypropylene | could not separate |
| Santoprene 50D | could not separate |
| Santoprene 60A | could not separate |

EXAMPLE 6

Another blend was prepared in a laboratory Banbury with the following ingredients.

| Component | Weight % |
|---|---|
| (a) Acrylic acid modified polypropylene MFR of 40 gm/10 min. at 230° C./2.16 kg | 30 |
| (b) An ethylene-propylene-diene terpolymer elastomer that is oil extended with paraffinic oil at 20 phr and has a Mooney viscosity of 83 ML 1 + 4 @ 100° C. | 70 |

This blend also contained 0.3% cure and 1.0% stabilizer masterbatch. The following results were obtained.

| Test | |
|---|---|
| Tensile Strength | 610 psi |
| Elongation | 250% |
| Tear Strength | 216 lbs./inch |
| Shore Hardness | 86A |
| Flexural Modulus | 10,300 psi |
| 100% Modulus | 544 psi |
| Adhesive Strength: | |
| Aluminum | 25 cohesive failure |
| Stainless Steel | 16 cohesive failure |
| Polypropylene | could not separate |
| Santoprene 50D | 22 cohesive failure |
| Santoprene 60A | 9 adhesive failure |

EXAMPLE 7

The following blend was made with the same components and procedures as Example 6 except that the percentages were different, component (a) was at 25% and component (b) was at 75%. The following results were obtained.

| Test | |
|---|---|
| Tensile Strength | 540 psi |
| Elongation | 300% |
| Tear Strength | 180 lbs/inch |
| Shore Hardness | 75A |
| Flexural Modulus | 6,000 psi |
| 100% Modulus | 476 psi |
| Adhesive Strength: | |
| Aluminum | 25 cohesive failure |
| Stainless Steel | 18 cohesive failure |
| Polypropylene | could not separate |
| Santoprene 50D | 14 cohesive failure |
| Santoprene 60A | 8.5 adhesive failure |

EXAMPLE 8

The following blend was prepared with the same components and procedures as in Example 6 except that the percentage of component (a) was 20% and component (b) was 80%. The following results were obtained.

| Test | |
|---|---|
| Tensile Strength | 443 psi |
| Elongation | 200% |
| Tear Strength | 148 lbs/inch |
| Shore Hardness | 65A |
| Flexural Modulus | 4,130 psi |
| Adhesive Strength: | |
| Aluminum | 20 cohesive failure |
| Santoprene 50D | 20 cohesive failure |
| Santoprene 60A | 8 adhesive failure |

EXAMPLE 9

A blend was made with the same components as Example 3 except the percentages were different. Component (a) was 36%, component (b) was 23%, and component (c) was 40%. The following test results were obtained.

| Test | |
|---|---|
| Tensile Strength | 2,000 psi |

-continued

| | |
|---|---|
| Elongation | 325% |
| Tear Strength | 650 lbs/inch |
| Shore Hardness | 55D |
| Flexural Modulus | 76,700 psi |
| 100% modulus | 1,800 psi |
| Garnder Impact | 222.64 inch pounds |
| Adhesive Strength: | |
| Aluminum | 22 pli adhesive failure |
| Stainless Steel | 50 pli cohesive failure |
| Polypropylene | could not separate |
| Santoprene 50D | could not separate |
| Santoprene 60A | could not separate |

EXAMPLE 10

An adhesive thermoplastic elastomer blend was made following the same procedure as Example 3 with the following changes in percentages of the three components; component (a) 36%, component (b) 8.5%, and component (c) 55%. The following results were obtained.

| Test | |
|---|---|
| Tensile Strength | 1,387 psi |
| Elongation | 460% |
| Tear Strength | 536 lbs/in. |
| Shore Hardness | 45D |
| Flexural Modulus | 40,810 psi |
| 100% modulus | 1,260 psi |
| Gardner Impact | 188.25 inch pounds |
| Adhesive Strength: | |
| Aluminum | 25 pli adhesive failure |
| Stainless Steel | 45 pli cohesive failure |
| Polypropylene | could not separate |
| Santoprene 50D | could not separate |
| Santoprene 60A | could not separate |

EXAMPLE 11

An adhesive blend was prepared with the same components and the same conditions as in Example 1 except that component (a) was a maleic anhydride grafted polypropylene having a MFR of 85 gm/10 min. at 230° C./216 kg. The following metal adhesive strengths were tested.

| Adhesion to: | |
|---|---|
| Aluminum | 29 pli adhesive failure |
| Stainless Steel | 25 pli adhesive failure |

EXAMPLE 12

An identical blend to the one made in Example 1 was prepared except that PF 141 PM, a chemically coupled homopolymer polypropylene, was substituted for component (a). The following adhesion testing was conducted.

| Adhesion to: | |
|---|---|
| Aluminum | None |
| Stainless Steel | None |

This shows that PF 141 PM does not promote metal adhesion.

EXAMPLE 13

A blend was produced in a laboratory Banbury containing the following ingredients.

| Component | Weight % |
|---|---|
| (a) A high density polyethylene grafted with 6% acrylic acid and has a MI of 4 grams/10 min. at 190° C./2.16 kg | 36 |
| (b) A LLDPE with an MI of 2 gm/10 min. at 190° C./2.16 kg | 36 |
| (c) An ethylene-propylene-diene terpolymer elastomer with a Mooney viscosity of 60 ML (2 + 10) at 250° F. | 28 |

The following physical tests were performed from injection molded test pieces.

| Test | |
|---|---|
| Tensile Strength | 1,946 psi |
| Elongation | 375% |
| Shore Hardness | 45D |
| Flexural Modulus | 42,513 psi |
| Adhesive Strength: | |
| Aluminum | 14 adhesive failure |
| Stainless Steel | 18 adhesive failure |
| Polypropylene | could not separate |

EXAMPLE 14

To show adhesion to wood the following examples were tested.

| Example # | Adhesion to Wood |
|---|---|
| 1 | 5 adhesive failure |
| 6 | 11 adhesive failure |

EXAMPLE 15

To show adhesion to various substrates the following adhesion testing was performed.

| Example # | Substrate | Adhesion (pli) |
|---|---|---|
| 3 | Copper | 3.5 adhesive failure |
| 10 | Tin plated steel | 49 adhesive failure |
| 10 | Chrome plated steel | 53 cohesive failure |
| 4,7 | Glass | 19,19 adhesive failure |

EXAMPLE 16

A blend identical to Example 3 was prepared except that 0.2% carbon black was added to determine the effect on adhesion.

| | Results |
|---|---|
| Adhesive Strength: | |
| Aluminum | 23 pli adhesive failure[a] |
| Stainless Steel | 26 pli adhesive failure |

[a] failure at adhesive/metal substrate interface

EXAMPLE 17

A blend was made with the same percentages and components as Example 7 except that no cure was used. This was done to determine the effect of curing on the physical properties.

| Tensile Strength | 450 psi |
| --- | --- |
| Elongation | 375% |
| Tear Strength | 166 lbs/inch |
| Shore Hardness | 72 A |

EXAMPLE 18

A blend identical to Example 3 was prepared except that 5% A-Fax 500 from Himont Co. was added to the formulation in place of 5% of component (b). This was done in order to examine the effect of small percentages of amorphous wax on adhesion to metal.

| Results | |
| --- | --- |
| Adhesive Strength: | |
| Aluminum | 23 pli adhesive failure[a] |
| Stainless Steel | 26 pli adhesive failure |

[a]failure at adhesive/metal substrate interface

The addition of low molecular weight wax did not adversely affect adhesive strength.

EXAMPLE 19

An identical blend to Example 1 was made except component (a) was a 4.0 MFR at 230° C./2.16 kg homopolymer polypropylene. All percentages were the same.

| Test | |
| --- | --- |
| Tensile Strength | 2,806 psi |
| Tear Strength | 742 lbs/in |
| Shore Hardness | 62D |
| Elongation | 190% |
| Flexural Modulus | 110,877 psi |
| 100% Modulus | 2,160 |
| Adhesive Strength: | |
| Aluminum | None |
| Stainless Steel | None |

EXAMPLE 20

The following example was tested for adhesive strength to Nylon 6.

| Example | Adhesive Strength |
| --- | --- |
| 10 | 8 pli adhesive failure |

What is claimed is:

1. An adhesive thermoplastic elastomer composition consisting essentially of:
    (a) about 15 to 40 weight percent of at least one polyolefin selected from the group consisting of polyethylene, polypropylene and mixtures thereof, modified by grafting with an unsaturated an aliphatic carboxylic acid or its derivatives selected from the group consisting of acid anhydride, acid chloride, isocyanate, oxazoline, epoxide, amine and hydroxide;
    (b) about 10 to 70 weight percent of at least one other non-elastomeric polyolefin resin prepared from at least one monomer selected from the group consisting of: butene, isobutylene, octene-1, 4-methyl pentene-1, ethylene, propylene, hexene-1 or mixtures thereof; and
    (c) about 20 80 weight percent of at least one partially cured olefinic elastomer, selected from the group consisting of elastomeric ethylene-propylene copolymer, elastomeric ethylene-propylene copolymers, elastomeric ethylene-propylene terpolymers, polyisoprene, polyisobutylene, polybutadiene, and natural rubber;
    wherein said partial cure of the elastomer is attained by a curing agent comprising about 1 to 99 percent of the amount necessary for a substantially complete cure.

2. The composition of claim 1 (a) wherein the polyolefin is selected from the group consisting of polypropylene grafted with maleic anhydride, polypropylene grafted with acrylic acid, or mixtures thereof.

3. The composition of claim 1, wherein the
    tensile strength varies from about 300 to 6000 psi;
    elongation at break varies from about 100 to 1000%;
    tear strength varies from about 100 to 800 pounds/inch;
    hardness varies from about 40 Shore A to 70 Shore D;
    100% modulus varies from about 100 to 3000 psi;
    flexural modulus (secant) varies from about 500 to 500,000 psi;
    Gardner Impact at −40° C. varies from about 50 to 500 inch-pounds.

4. The composition of claim 1, wherein the 180° C. peel adhesion in pounds per linear inch with
    aluminum varies from about 10 to 70;
    copper varies from about 2 to 20;
    stainless steel varies from about 10 to 100;
    chrome plated steel varies from about 10 to 50;
    tin varies from about 10 to 50;
    polypropylene varies from about 5 pli to could not separate;
    Santoprene 50D varies from about 5 pli to could not separate;
    Santoprene 60D varies from about 5 pli to could not separate; and
    nylon varies from about 2 to 10 pli.

5. The composition of claim 1, including additives selected from the group consisting of other polymeric or elastomeric materials, inorganic fillers or reinforcers, antioxidants, UV stabilizers, release agents, processing aids, nucleating agents, and colorants cumulatively not exceeding 50% by weight of the total composition.

6. The composition of claim 1 (b) wherein said polyolefin resin is a copolymer selected from the group consisting of ethylene-vinyl acetate, ethylene-ethyl acrylate, and ethylene-methyl acrylate.

7. The composition of claim 1, wherein the partial cure comprises about 5 to 75% of the amount necessary for a substantially complete cure.

8. The composition of claim 1, wherein the partial cure comprises about 10 to 40% of the amount necessary for a substantially complete cure.

9. The composition of claim 1, wherein:
    (a) is selected from the group consisting of acrylic acid modified polypropylene, maleic anhydride modified polypropylene, and mixtures thereof,
    (b) is selected from the group consisting of polyethylene, polypropylene, and mixtures thereof;
    (c) is selected from the group consisting of saturated ethylene-propylene copolymer rubber, unsaturated ethylene-propylene non-conjugated diene terpolymer rubber and mixtures thereof.

* * * * *

UNITED STATES PATENT AND TRADEMARK OFFICE
CERTIFICATE OF CORRECTION

PATENT NO. : 4,957,968
DATED : September 18, 1990
INVENTOR(S) : Ashok M. Adur et al It is certified that error appears in the above-identified patent and that said Letters Patent is hereby corrected as shown below:

At column 3, line 57, delete "crosslinked".

At column 5, line 13, change "ran9e" to
 -- range --.

At column 11, line 14, change "Fors" to
 -- Ford --.

At column 13, line 62, after "polypropylene"
 insert -- with a --.

At column 18, line 1, after "20" insert -- to --.

At column 18, line 3, delete
 "elastomeric ethylene-propylene co-".

At column 18, line 4, delete "polymer".

Signed and Sealed this

Twelfth Day of May, 1992

Attest:

DOUGLAS B. COMER

Attesting Officer  Acting Commissioner of Patents and Trademarks